United States Patent [19]

Shimanari et al.

[11] Patent Number: 5,808,649
[45] Date of Patent: Sep. 15, 1998

[54] IMAGE FORMING APPARATUS FOR COLOR IMAGE FORMING

[75] Inventors: Tatsumi Shimanari, Fussa; Takao Yorifuji; Noriki Ono, both of Higashiyamato; Moriyuki Kouroku, Higashimurayama, all of Japan

[73] Assignees: Casio Computer Co., Ltd.; Casio Electronics Manufacturing Co., Ltd., both of Tokyo, Japan

[21] Appl. No.: 757,597

[22] Filed: Nov. 29, 1996

[30] Foreign Application Priority Data

Dec. 1, 1995 [JP] Japan .................................. 7-314398

[51] Int. Cl.$^6$ ....................................................... B41J 2/47
[52] U.S. Cl. ........................................... 347/115; 347/242
[58] Field of Search ..................................... 347/242, 257, 347/263, 138, 152, 232, 115, 116

[56] References Cited

U.S. PATENT DOCUMENTS 5,404,156  4/1995  Yamada et al. .......................... 347/115
5,717,451  2/1998  Katano et al. ........................... 347/242

*Primary Examiner*—Mark J. Reinhart
*Attorney, Agent, or Firm*—Frishauf, Holtz, Goodman, Langer & Chick

[57] ABSTRACT

An image forming apparatus has four color image forming and transferring portions and four image writing heads supported by a cover to be rotatably movable upwardly and downwardly. Each case of the portions is so shaped that it does not interfere with the rotational movement of the heads, and has the same shape. Particularly, two opposite side surfaces of the case is so shaped that it does not project into the movement locuses of the heads not to collide them.

20 Claims, 7 Drawing Sheets

IMAGE FORMING APPARATUS FOR COLOR IMAGE FORMING

BACKGROUND OF THE INVENTION

1. Field of the Invention

The present invention relates to an image forming apparatus such as a printer, a copying machine, etc., and more specifically, to an image forming apparatus in which a plurality of image forming portions, each including an image carrier, are arranged side by side.

2. Description of the Related Art

Heretofore, electrophotographic type image forming apparatuses have widely been known as examples of image forming apparatuses such as printers, copying machines, etc. In each of these apparatuses, a latent image is formed on a photoconductive member used as an image carrier by optical writing, and is developed into a toner image. The toner image is transferred to a paper sheet and is fixed. Various improvements have been made on those image forming apparatuses each of which uses only one image forming portion including a photoconductive member and being formed with a black image of a black toner. Recently, highly small-sized image forming apparatuses of the desk type have been started to be marketed. In some of these apparatuses, a main part of an image forming portion is structured to a unit, and the unit of the image forming portion can be removed from the apparatus body when a top cover swingably mounted on the apparatus body is opened. With this arrangement, maintenance and inspection of internal elements of the apparatus can be carried out easily without enlarging an installation area of the apparatus.

Also, small sized full-color image forming apparatuses have been requested, and is started to be marketed.

These color image forming apparatuses can be classified into two types, one of which is a single-drum type and the other of which is a multi-drum type (tandem type). In the single-drum type, since four toner images of different colors, yellow (Y), magenta (M, red) and cyan (C, greenish-blue) as the primary colors, and black (Bk) for exclusively printing characters and the like, are transferred one by one to a paper sheet, four printing (image forming) processes must be performed in order to obtain one full colored image on one paper sheet, thereby requiring a long time. In the tandem type, the four toner images are successively transferred to a paper sheet in one printing process, or once are successively temporarily transferred to an intermediate transfer member and then they are transferred to a paper sheet at one time. Thus, the tandem type can perform the full color printing four times faster than the single-drum type. Recently, since structural elements of the tandem-type image forming apparatuses have been small-sized and structured to some units, and therefore, become relatively low-priced, there have been proposed various tandem type color image forming apparatuses.

FIG. 7 schematically shows a longitudinal sectional view of one of the conventional tandem-type color image forming apparatus as described above. Referring to FIG. 7, a sheet cassette 21 is removably attached to a lower part of a front surface of an apparatus body of a tandem type color image forming apparatus 20. Upper one of sheets P in the cassette 21 is picked up by a pick-up roller 22, and fed to an image forming section by a standby roll pair 23 at a timing for suitable printing. In the image forming section, a conveyor belt 24 for transporting the sheet P is stretched in a flattened shape by a plurality of rollers in a sheet transportation direction (from right to left in FIG. 7), and four photoconductive drums 25 are arranged side by side along an upper horizontally extending portion of the belt to face it. Each drum 25 is surrounded by an initial charger 26, a developing roller 27-1 arranged in a developing device 27, and a transfer charger 28 and a cleaner 29, and the charger 28 is opposed to the drum with the belt 24 interposed therebetween. A predetermined space is provided between the initial charger 26 and the developing device 27, and a laser beam for digital exposure from a laser head 31 is applied to a peripheral surface of the drum 25 through the space. The laser head 31 includes a light source, rotary mirrors 31-1, convergent lenses 31-2, reflecting mirrors 31-3, irradiation apertures 31-4, etc.

In this color image forming apparatus 20, the belt 24 circulates in the counterclockwise direction in FIG. 7, thereby transporting the sheet P. Toner images of different colors are transferred successively from the four photoconductive drums 25 to the sheet P while the sheet P is transported as described above. The transferred toner images are fixed to the sheet P by a fixing unit 32, and the sheet P is then discharged with its image carrying surface directing upward through an outlet 34 in a back surface of the apparatus by means of an exit roll pair 33.

In the image forming apparatus of this type, the laser head 31 is very large so that all of support frames each of which supports each developing device 27 and each photoconductive drum 25 located below the laser head 31 or all of the units each of which is structured by each developing device 27 and each drum 25 must be drawn out of the apparatus body in a direction perpendicular to a drawing plane of FIG. 7 in order to perform a maintenance work for the devices and drums. This operation is very troublesome and this structure hinders the reduction of the apparatus size.

In order to improve the maintainability of the apparatus, the top of the apparatus may be structured by an openable top cover, the laser head 31 may be arranged in a lower portion of the apparatus body, and the photoconductive drums 25, initial chargers 26, developing devices 27, cleaners 29, belt 24, etc. may be fixed to the openable top cover. However, the apparatus arranged in this manner is also large in size and expensive like the apparatus shown in FIG. 7, and cannot meet the recent demand to obtain a small-sized, low-priced OA equipment.

Accordingly, if the laser head is miniaturized, is arranged near to each photoconductive drum 25 and four miniaturized laser heads for four photoconductive drums 25 are attached on the inner surface of the top cover of the apparatus body so that they can be moved close to or away from their corresponding drums 25 when the cover is swung downward or upward, the maintenance work of the apparatus can be facilitated, and the apparatus body can be reduced in size, like the aforesaid apparatus which has one image forming portion for only black toner image.

However, since the development for structuring the tandem type color image forming apparatus in a small size recently starts, the miniaturized tandem type color image forming apparatus using the above described miniaturized laser heads has not been practically used.

SUMMARY OF THE INVENTION

This invention is derived from the above described circumstances, and an object of this invention is to provide an image forming apparatus in which a shape and arrangement of each structural element, the element being attached on a swingable member of an apparatus body so as to be removably set therein to cooperate with any other structural elements mounted in the apparatus body, are designed suitable for miniaturization of the apparatus and for performing easily maintenance of the apparatus.

In order to achieve the above object, an image forming apparatus according to the present invention comprises: a plurality of image forming portions; a plurality of processing means for image formation on each of the image forming portions; each of the image forming portions including an image carrier and a casing enclosing at least one of the processing means for image formation on the image carrier; first support means for supporting the image forming portions side by side at predetermined intervals; a plurality of write means for writing image information on each of the image carriers opposed thereto; second support means for supporting the write means side by side at predetermined intervals; and a rock mechanism allowing one of the first and second support means to rock around at one end thereof in a direction in which the image forming portions or the write means supported by one of the first and second support means are arranged, with respect to the other support means, so that the image forming portions and the write means can move relatively to one another. Each casing has that portion of the same shape as to each other at a predetermined side of a write position on that image carrier corresponding to each casing, at the write position that write means which corresponds to the case, writing an image information on that image carrier. That portion of each casing has a first side surface which is located near to the rock mechanism and directs in a direction approaching the rock mechanism, and a second side surface which is located farther away from the rock mechanism than the first side surface and directs in a direction opposite to the direction in which the first side surface directs.

And, where the image forming portions are arranged in any order with each of the same shaped portions of their casings being located at that side of the write position corresponding thereto, which is far away from the rock mechanism than the other side of the corresponding write position, the first side surface of the casing of the image forming portion is so shaped that it escapes from a locus of that portion of that write means, that write means being located farthest from the rock mechanism and that portion being located farthest from the rock mechanism in that write means, when the image forming portion is arranged to be farthest from the rock mechanism and the write means is moved away from and approached the casing corresponding thereto. Further, the second side surface of the casing of the image forming portion is so shaped that it escape from a locus of that portion of that write means, that write means being located secondarily nearest to the rock mechanism and that portion being located nearest to the rock mechanism in that write means, when the image forming portion is arranged to be secondarily nearest to the rock mechanism and that write means is moved away from and approached the casing corresponding thereto.

Alternatively, where the image forming portions are arranged in any order with each of the same shaped portions of their casings being located at that side of the write position corresponding thereto, which is nearer to the rock mechanism than the other side of the write portion, the first side surface of the casing of the image forming portion is so shaped that it escapes from a locus of that portion of that write means, that write means being located secondarily nearest to the rock mechanism and that portion being located farthest from the rock mechanism in that write means, when the image forming portion is arranged to be farthest from the rock mechanism and that write means is moved away from and approached the casing corresponding thereto. Further, the second side surface of the casing of the image forming portion is so shaped that it escape from the locus of that portion of that write means, that write means being located nearest to the rock mechanism and that portion being nearest to the rock mechanism in that write means, when the image forming portion is arranged to be nearest to the rock mechanism and that write means is moved away from and approached the casing corresponding thereto.

In the image forming apparatus according to the invention arranged in this manner, one of the first support means for supporting the image forming portions at the predetermined intervals and the second support means for supporting the write means at the predetermined intervals, is allowed to rock around the other support means so that the image forming portions and the write means can move relatively to one another. Therefore, maintenance of the structural elements of the apparatus is easy. Further, since the shape of the casing which encloses the image carrier corresponding thereto and at least one of the processing means for image formation on the corresponding image carrier, is so designed that it does not interfere with the locus of the write means corresponding to the casing when the write means is separated from the corresponding casing, each of the casings can be formed to have the same shape as to each other and a maximum capacity within the arrangement space. Thus, a tandem type image forming apparatus which can be operated easily can be provided at low cost.

In the image forming apparatus according to the invention and characterized by being structured as described above, moreover, the first support means is fixed to the body of the apparatus, and the second support means is movable. Alternatively, the second support means is fixed to the apparatus body, and the first support means is movable. Further the casing constitutes a developing device for developing the image information written on the image carrier by the write means, with use of a developing agent. Furthermore, the write means is optical write means including an optical member, and the image carrier is a photoconductive member.

In order to reduce the size of the image forming apparatus according to the invention, moreover, the optical write means should preferably be formed of an LED (Light Emitting Diode) head. Furthermore, a tandem-type color image forming apparatus for forming color images can be suitably constructed if the image forming portions are used three or four in number.

BRIEF DESCRIPTION OF THE DRAWINGS

The above and other aspects and features of the invention will be more apparent from the ensuing detailed description taken in connection with the accompanying drawings, in which.

The embodiments and modification of the present invention will now be describe in detail with reference to the accompanying drawings.

DETAILED DESCRIPTION OF THE PREFERRED EMBODIMENTS

Figure 1:
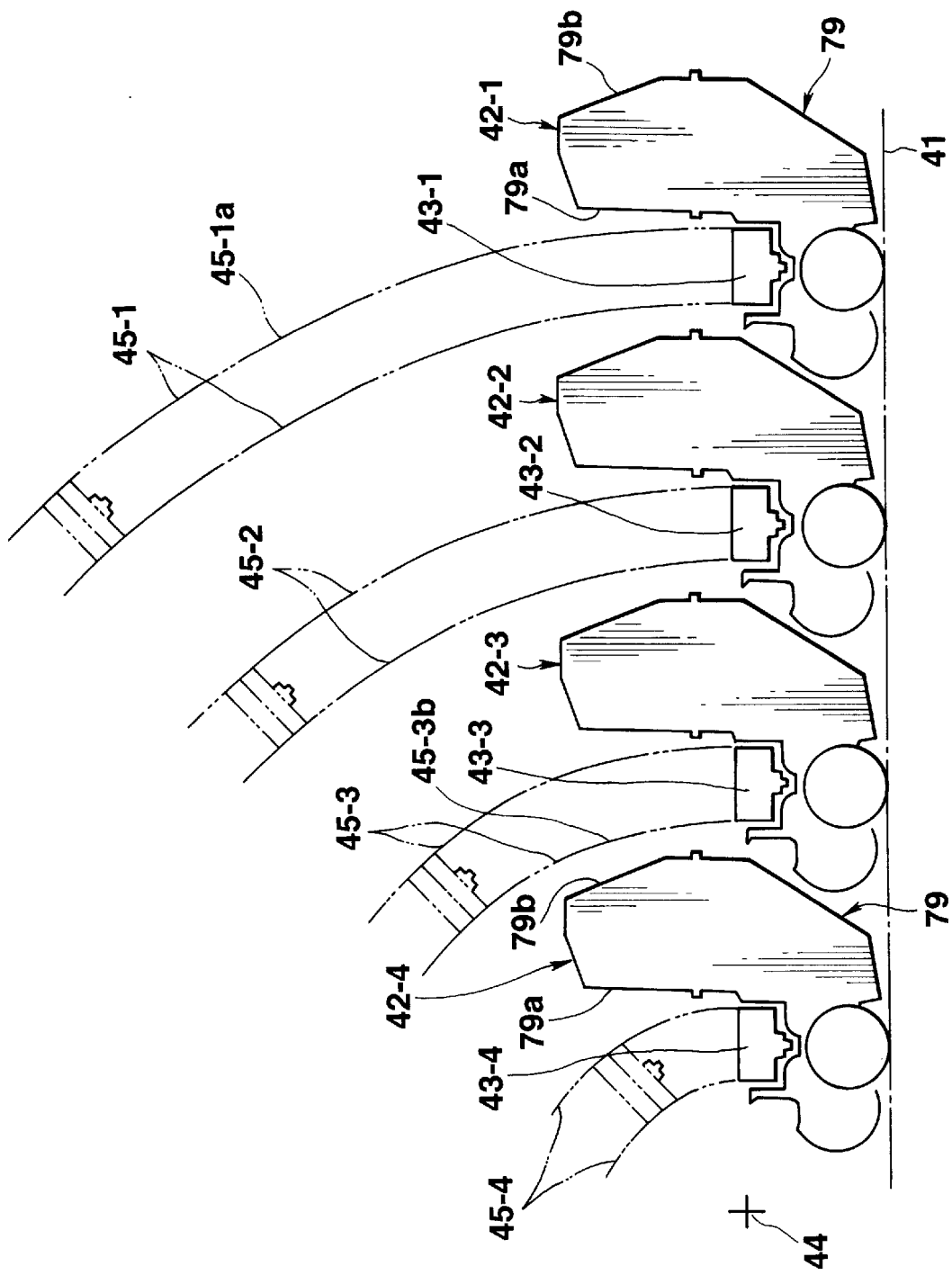
FIG. 1 is a side view schematically showing an arrangement of a main part of an image forming apparatus according to one embodiment of the invention.

FIG. 1 is a side view schematically showing an arrangement of a main part of an image forming apparatus according to one embodiment of the invention. As shown in FIG. 1, the main part of the image forming apparatus (apparatus body) includes a sheet conveyance path drawn by one-dot chain line and structured by a conveyor belt 41, four image forming portions 42-1, 42-2, 42-3 and 42-4 supported by a support portion of the apparatus body (first support means), contacting the sheet conveyance path 41, and arranged side by side in a transportation direction (from right to left) of the sheet conveyance path 41, and printing heads (write means) 43-1, 43-2, 43-3 and 43-4 arranged to correspond to the image forming portions 42-1, 42-2, 42-3 and 42-4. These heads 43-1, 43-2, 43-3 and 43-4 are LED (Light Emitting Diode) heads, and are supported in parallel to each other by a back or lower surface of a top cover member (second support means, mentioned later) one end of which is rotatably supported by a supporting shaft (support mechanism) 44 on the apparatus body to be rotated between a closed portion and an open position. When the top cover member is moved upward toward its open portion or downward toward its closed portion, the printing heads 43-1, 43-2, 43-3 and 43-4 are moved upward or downward to be removed from or located in predetermined positions in the apparatus body, and movement locuses of the printing head 43-1, 43-2, 43-3 and 43-4 are indicated by tow-dot chain lines 45-1, 45-2, 45-3 and 45-4 in FIG. 1. Thus, the image forming portions 42-1, 42-2, 42-3 and 42-4 and the printing heads 43-1, 43-2, 43-3 and 43-4 can move relatively to one another.

Figure 2:
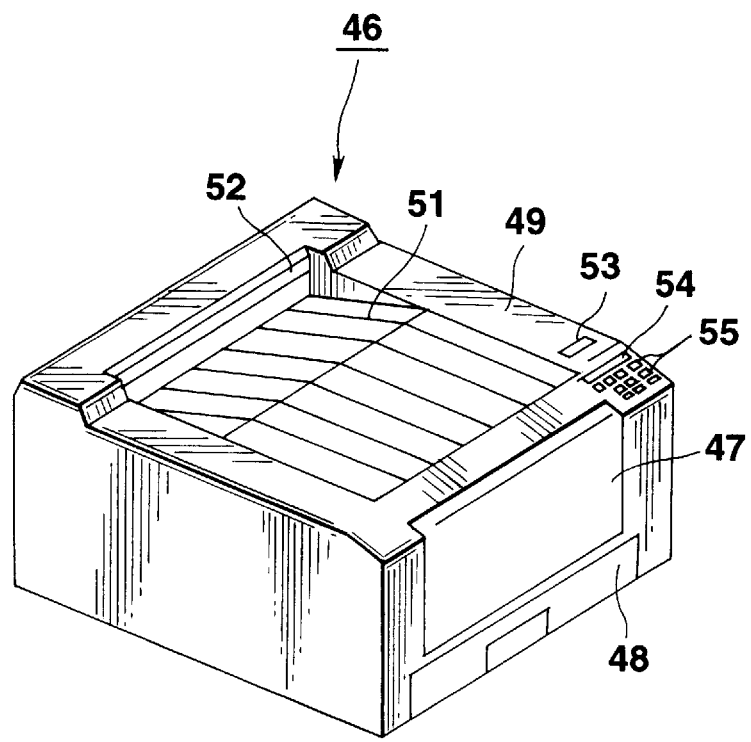
FIG. 2 is a perspective view schematically showing an outer appearance of the image forming apparatus according to the one embodiment of the invention.

FIG. 2 is a perspective view schematically showing an outer appearance of the image forming apparatus with the tandem-type image forming units, according to the present invention. As shown in FIG. 2, the image forming apparatus is a desk top type printer which is provided with an openable tray 47 on a front surface (on a right-hand surface in FIG. 2) of an apparatus body 46 and a detachable sheet cassette 48 at its lower part. In an upper surface of a top cover member 49 a paper discharge tray 51 and an upper paper sheet discharge opening 52 are formed, and the tray 51 receives image formed paper sheets discharged from the apparatus body 46 through the upper opening 52. A power switch 53, a liquid crystal display unit 54, a plurality of input keys 55, etc. are arranged on one side of a front portion of the upper surface of the top cover member 49.

Figure 3:
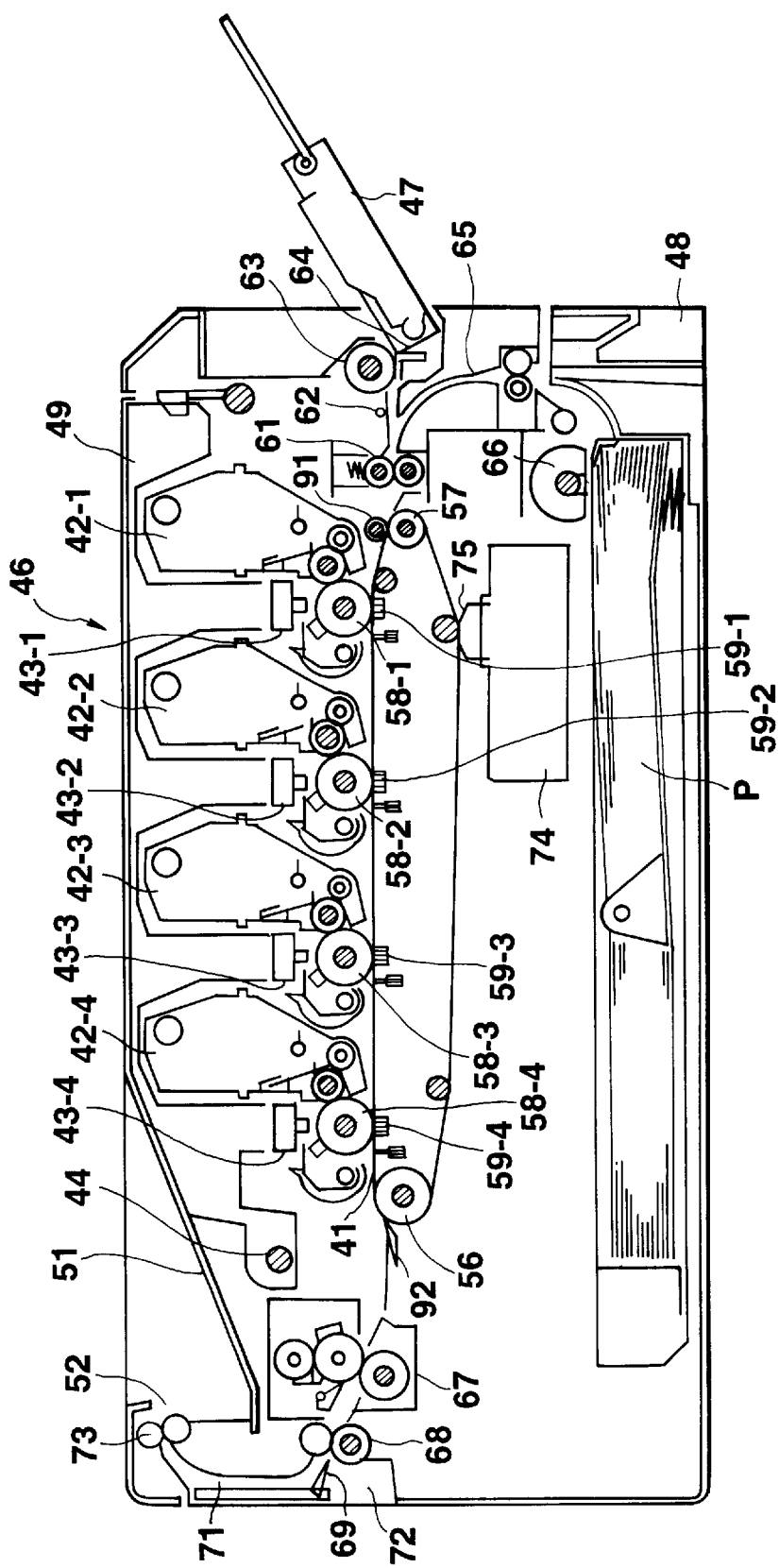
FIG. 3 is a longitudinal sectional view of the image forming apparatus of FIG. 2.

FIG. 3 is a longitudinal sectional view of the image forming apparatus of FIG. 2. As shown in FIG. 3, the image forming apparatus 46 includes an image forming section located substantially in its center. The image forming section has a sheet conveyance path which is formed by an upper horizontally extending portion of a flattened loop of a conveyor belt 41, the belt being stretched between a driving roller 56 and a driven roller 57 to be circulated, and photoconductive drums (image carriers) 58-1, 58-2, 58-3 and 58-4 which are incorporated in the image forming portions 42-1, 42-2, 42-3 and 42-4 to contact the sheet conveyance path. The printing heads 43 supported on the lower surface of the top cover member 49, are located just above their corresponding drums 58 when the top cover member 49 is located in its closed position.

Transfer brushes 59-1, 59-2, 59-3 and 59-4 are arranged in a space encircled by the belt 41 so as to face the photoconductive drums 58-1, 58-2, 58-3 and 58-4 with the upper horizontally extending portion of the belt 41 being interposed therebetween. Various devices (mentioned in detail later) for forming a toner image on each drum 58-1, 58-2, 58-3 or 58-4 are arranged around each drum in each image forming units 42-1, 42-2, 42-3 or 42-4.

A standby roller pair 61 and a sheet sensor 62 are arranged on an upstream side (right-hand side of FIG. 3) of the belt 41 with respect to the sheet conveyance direction on the belt 41. On the upstream side of the roller pair 61 and the sensor 62, a sheet introducing path is branched horizontally (or frontward) and downwardly, and a combination of a paper-feed roller 63 and a paper separating member 64, and the openable tray 47 are arranged at an extending end of the branched horizontally extending sheet introducing path sideways. At an extending end of the branched downwardly extending sheet introducing path 65, a paper feed roller 66 and the sheet cassette 48 containing a large number of sheets P are arranged. On the downstream side of the belt 41 with respect to the sheet conveyance direction, a fixing device 67, an exit roller pair 68, and a switching lever 69 are arranged. The fixing device 67 has a pressure roller, heating roller, surface cleaner, oil application roller, thermistor, etc. all of which are mounted in a heat-insulating casing, and thermally fixes toner images transferred from the drums 58-1, 58-2, 58-3 and 58-4 to the sheet, on the sheet. The switching lever 69 guides the sheet to an upwardly extending discharge path 71 when it is in a laid-down position shown in FIG. 3, and guides the sheet to a discharge opening 72 formed in the rear surface of the apparatus body when it is in its raised-up position. The extending end of the upwardly extending discharge path 71 is connected with the upper opening 52 via an exit roller pair 73.

A cleaner bottle 74 is detachably disposed in the apparatus body between the lower horizontally extending portion of the belt 41 and the sheet cassette 48. A blade scraper 75 is attached to a top portion of the bottle 74, and a distal end of the scraper 75 abuts against the lower surface of the lower horizontally extending portion of the belt 41. The scraper 75 scrapes off a toner remaining on the outer peripheral surface of the belt 41, thereby cleaning the belt, and the removed toner is stored in the cleaner bottle 74.

Figure 4:
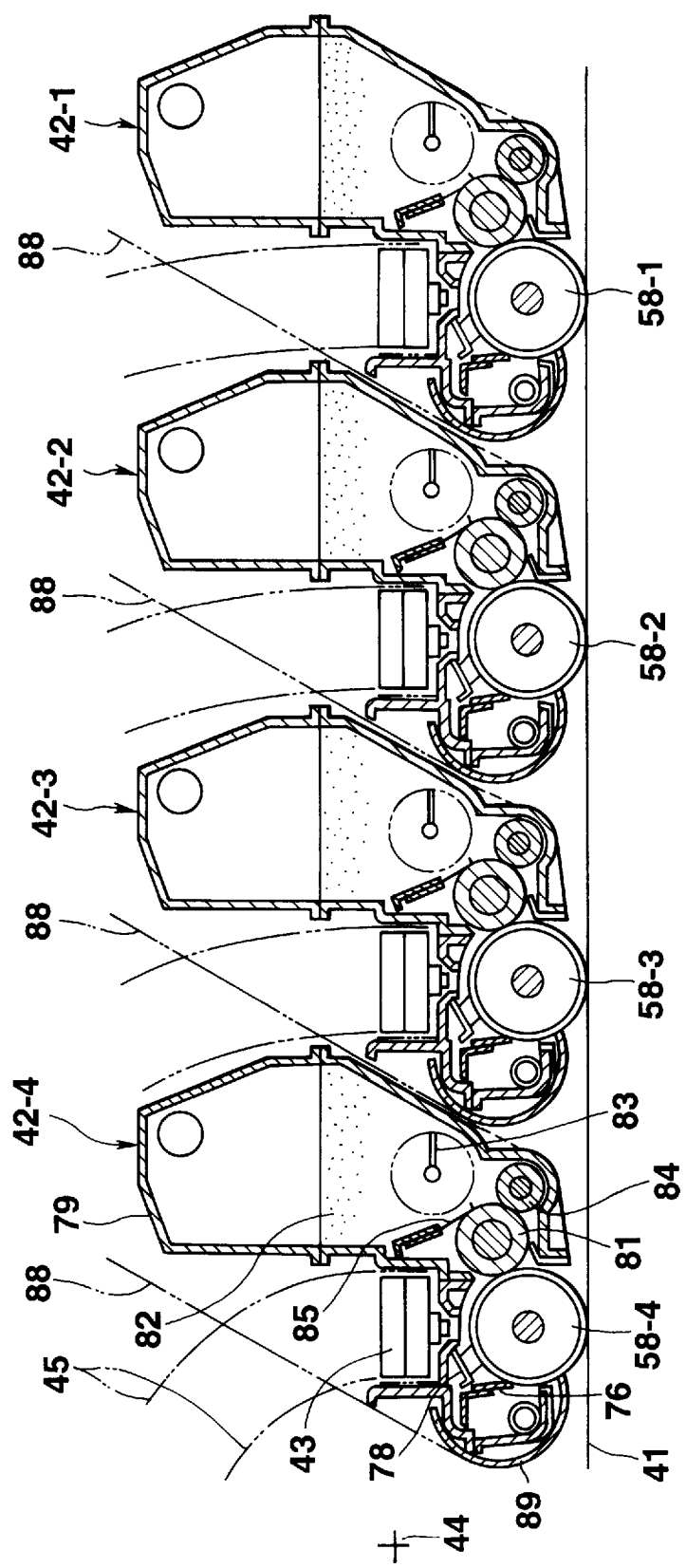
FIG. 4 is an enlarged longitudinal sectional view of image forming units used in the image forming apparatus of FIG. 2.

FIG. 4 is an enlarged longitudinal sectional view of the image forming portions 42-1, 42-2, 42-3 and 42-4 shown in FIG. 3. All the portions 42-1, 42-2, 42-3 and 42-4 have the same structure as to each other, but they contain toners of different colors. As shown in FIG. 4, each image forming portion 41-2, 42-2, 42-3 or 42-4 includes the photoconductive drum 58-1, 58-2, 58-3 or 58-4, a cleaner 76, an initial charger 78, and a developing device 79, the cleaner 76, the charger 78 and the developing device 79 being arranged around the drum corresponding thereto. The developing device 79 has a toner container, and constitutes a part of a casing of the each image forming portion 42-1, 42-2, 42-3 or 42-4. The drum 58-1, 58-2, 58-3 or 58-4, cleaner 76, and charger 78 are held by the remaining part of the casing of the portion 42-1, 42-2, 42-3 or 42-4.

Each developing device 79 holds a developing roller 81 in its bottom opening. The developing devices 79 contain toner 82 of different colors such as yellow (Y), magenta (M), cyan (C), and black (Bk), individually. A toner stirring member 83 is disposed in the lower part of each developing device 79. The member 83 rotates in the manner indicated by two-dot chain line in FIG. 4, thereby stirring and supplying the toner 82 to a toner feed roller 84 located under the stirring member 83. The feed roller 84 is a sponge roller, is pressed on the developing roller 81, and rubs the toner 82 from the stirring member 83 against the outer peripheral surface of the roller 81. A doctor blade 85 of a leaf spring also contacts the outer peripheral surface of the roller 81. The blade 85 applies frictional electric charge to the toner 82 to assist the adhesion of the toner to the developing roller 81, and regulates the thickness of a toner layer on the roller 81.

Each of the above described various elements incorporated in each image forming portion 42-1, 42-2, 42-3 or 42-4 has a gear or terminals (not shown). And, the gear or terminals engages with a drive mechanism or are connected to power supply terminals in the apparatus body 46, when each image forming unit is arranged at a predetermined mounting position in the body 46, as shown in FIG. 3.

When the top cover member 49 is located in its closed position as shown in FIG. 3, each printing head 43 supported on the top cover member 49, is arranged, in a predetermined image forming position between the initial charger 78 and the developing roller 81, in each image forming portion 42-1, 42-2, 42-3 or 42-4. When the top cover member 49 is rotated upward to its open position from the closed position, each printing head 43 is removed from the image forming position shown in FIG. 3 and arched movement locuses 45 of the printing heads 43 are drawn by two-dot chain lines. After the cover member 49 is located in its open position, each image forming portion 42-1, 42-2, 42-3 or 42-4 can be independently removed upward from its predetermined mounting position in the apparatus body 46, and movement locuses 88 of the image forming portions are inclined straight lines and are drawn by two-dot chain lines. When each image forming portion 42-1, 42-2, 42-3 or 42-4 is removed from the apparatus body 46, a protection cover 89 rotates in the counterclockwise direction from its retracted position shown in FIG. 3 and covers a lower portion of the outer peripheral surface of its corresponding photoconductive drum 58-1, 58-2, 58-3 or 58-4 because that lower portion projects downward from the casing of each portion 42-1, 42-2, 42-3 or 42-4.

When the power is turned on and input keys are operated to input data such as the number of sheets used for printing, a desired printing mode such as a full-color printing (image formation) mode, and other items, in the image forming apparatus 46, the paper-feed roller 66 shown in FIG. 3 picks up one sheet P from the sheet cassette 48 to feed it toward the standby roller pair 61 through the sheet path 65. Alternatively, the paper-feed roller 63 feeds one sheet from the openable tray 47 toward the standby roller pair 61. When the sheet sensor 62 detects the sheet P, the standby roll pair 61 stops its rotation with a leading end of the sheet P contacting a contact point in the roller pair 61.

At the same time as described above, the driving roller 56 starts to rotate in the counterclockwise direction, and the conveyor belt 41 circulates in the counterclockwise direction with its upper horizontally extending portion contacting the four photoconductive drums 58-1, 58-2, 58-3 and 58-4.

Also, the image forming portions 42-1, 42-2, 42-3 and 42-4 are successively operated according to their printing timing, whereupon the photoconductive drums 58-1, 58-2, 58-3 and 58-4 are successively rotated in the clockwise direction. Further, the printing heads 43-1, 43-2, 43-3 and 43-4 are successively operated. In each image forming portion, as shown in FIG. 4, the initial charger (brush charger) 78 applies uniform electric charge to the outer peripheral surface of its corresponding drum 58-1, 58-2, 58-3 or 58-4, and its corresponding head 43-1, 43-2, 43-3 or 43-4 exposes the outer peripheral surface of the corresponding drum in response to an image signal supplied to the corresponding head, thereby forming an electrostatic latent image on the outer peripheral surface of the corresponding drum. The developing roller 81 transfers the toner 82 to a low-potential region of the latent image, and forms (develops) a toner image on the outer peripheral surface of the corresponding drum.

The standby roller pair 61 starts to rotate and to feed the sheet P to a sheet inlet of the image forming section, so that a print starting position on the sheet P coincides with a leading end of the toner image formed on the peripheral surface of the first photoconductive drum 58-1. While the sheet P is fed to the sheet inlet (that is the first drum 58-1) from the standby roller pair 61, the sheet P is pinched by the driven roller 57 and a press roller 91, together with conveyor belt 41, and is securely attached on the belt 41 not to be deflected on the belt 41 until the sheet P reaches at the driving roller 56. While the sheet P is conveyed by the belt 41 in this manner, toner images of different colors are successively transferred from the drums 58-1, 58-2, 58-3 and 58-4 to the sheet P by electric fields generated between each photoconductive drum 58-1, 58-2, 58-3 or 58-4 and its corresponding transfer brush 59-1, 59-2, 59-3 or 59-4.

After the toner images of four different colors, yellow (Y), magenta (M), cyan (C) and black (Bk), are transferred to the sheet P, the sheet P is separated from the conveyor belt 41 by a separating claw 92 at a position corresponding to the driving roller 56, and is guided to the fixing device 67. After the toner images are thermally fixed on the sheet P by the device 67, the sheet P is discharged from the apparatus body through the rear sheet discharge opening 72 with the toner images directed upward or through the upper sheet discharge opening 52 with the images directed downward, by the discharge roller pair 68.

In the image forming apparatus structured as described above, each developing device 79 (see FIG. 4) which is a part of the casing of each image forming portion 42-1, 42-2, 42-3 or 42-4, should be designed to store as much toner as possible. By doing this, the frequency of the toner supply work to each developing device can be lowered, and the operation efficiency of image forming apparatus can be improved.

As shown in FIGS. 1 and 4, each printing head 43-1, 43-2, 43-3 or 43-4 is moved upward and downward between the developing device 79 of its corresponding image forming portion 42-1, 42-2, 42-3 or 42-4 and the developing device 79 of its neighboring image forming portion when the top cover 49 is moved between the closed position and the open position. And, at that time, each printing head does not collide with any developing devices. In other words, the size of each developing device 79 in a radius direction from the rotational center shaft 44 can be set as large as possible as far as each developing device 79 does not intersects with the moving locuses of its corresponding printing head and the moving locuses of the printing head of its neighboring image forming unit.

Therefore, the size of each developing device 79 in the radius direction can set larger as the location of each developing device 79 is moved away of the rotational center shaft 44 of the top cover member 49, because the radius of each movement locus of each printing head 43-1, 43-2, 43-3 or 43-4 around the rotational center shaft 44 becomes large as the location of each printing head is moved away from the rotational center shaft 44.

But, if the size of each developing device 79 is varied to each other, the total manufacturing and assembling cost of all of the developing devices becomes large.

In the image forming apparatus according to the present invention, the developing devices 79 of the four image forming portions 42-1, 42-2, 42-3 and 42-4 are formed to have the same shape as to each other and each has a capacity as large as possible. Referring again FIG. 1, a method for setting the size of each developing device 79 to achieve the above described object will be described.

In each of the image forming portions 42-1, 42-2, 42-3 and 42-4, as shown in FIG. 1, the developing device 79 is a part of the casing of each image forming portion, and is located farther away from the rotational center shaft 44 than the remaining part of the casing. Each developing device 79 has a first side surface 79a (see the portion 42-1 or 42-4 of FIG. 1) which is directed toward the rotational center shaft 44, and a second side surface 79b which is located farther away from the rotational center shaft 44 than the first side surface 79a and is directed in a direction being away from the rotational center shaft 44. And, the casings of the four portions 42 have the same shape as to each other. The first side surface 79a is so shaped that it does not collide with the movement locus 45-1a of that end of that printing head 43-1, that printing head 43-1 being located farthest from the rotational center shaft 44 and that end also being located farthest from the rotational center shaft 44 in that printing head 43-1, even if the developing device 79 having the above shaped first side surface 79a is located farthest from the rotational center shaft 44 than the other developing devices. Since the radius of each movement locus 45-2, 45-3 or 45-4 of the other printing heads 43-2, 43-3 and 43-4 is smaller than each radius of the movement locuses 45-1 of that printing head 43-1, even if the four image forming portions 42-1, 42-2, 42-3 and 42-4 are located in any of the four predetermining mounting positions in the apparatus body, each of them never collides with the printing head 43-1, 43-2, 43-3 or 43-4 corresponding thereto.

As shown in FIG. 1, the second side surface 79b is so shaped that it does not collide with the movement locus 45-3b of that end of that printing head 43-3, that printing head 43-3 being located at a position which is secondary nearest to the rotational center shaft 44, and that end being located nearest to the shaft 44 in that printing head 43-3, even if the developing device 79 having the above shaped second side surface 79b is located nearest to the rotational center shaft 44 than the other development devices. Since the radius of each movement locus 45-2 or 45-1 of the other printing head 43-2 or 43-1 which is located farther away from the shaft 44 than that printing head 43-3 is larger than the radius of the movement locus 45-3 of the printing head 43-3, even if the four image forming portions 42-1, 42-2, 42-3 and 42-4 are located in any of four predetermined mounting positions in the apparatus body in which the side surfaces 79b are faced to the locuses 45-1, 45-2 and 45-3 of the printing heads 43-1, 43-2 and 43-3, not to mention the most upstream position free from any locuses of the printing heads 43, therefore, each of them never collides with the printing head 43-1, 43-2 or 43-3 corresponding to that image forming portion 42-2, 42-3 or 42-4 which is located neighboring one at a side away from the shaft 44. And, the movement locuses 45-4 of the printing head 43-4 having the smaller radius than that of the movement locuses 45-3 of that printing head 43-3 is free from any developing device 79, as shown in FIG. 1.

Each image forming portion 42-1, 42-2, 42-3 or 42-4 has been described as a single assembly unit, but it may be a multi assembly unit which is formed by assembling a plurality of subunits.

Figure 5A:
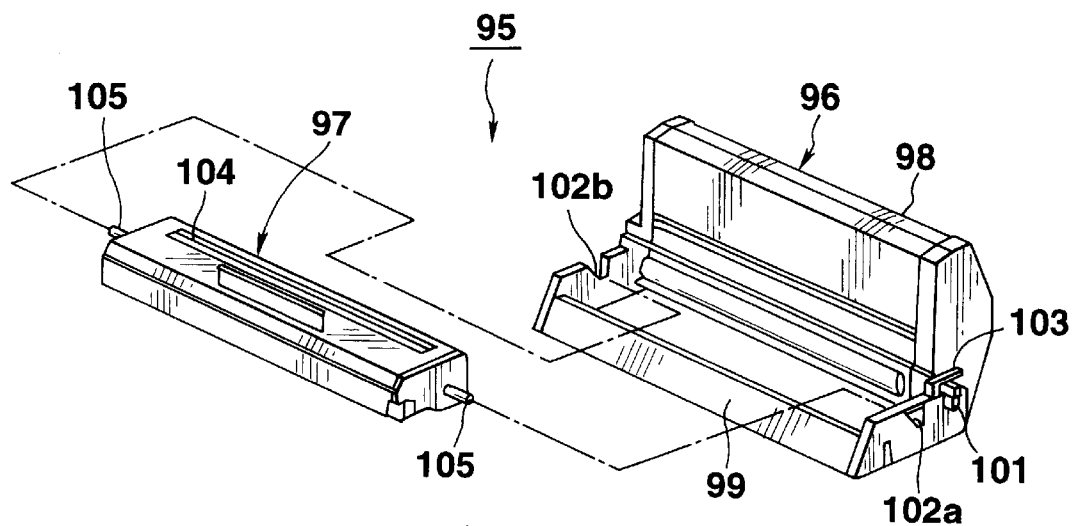
FIGS. 5A, 5B and 5C are perspective views showing steps of an assembling process for assembling two subunits to form one modification of the image forming unit of the one embodiment of the invention.
Figure 5B:
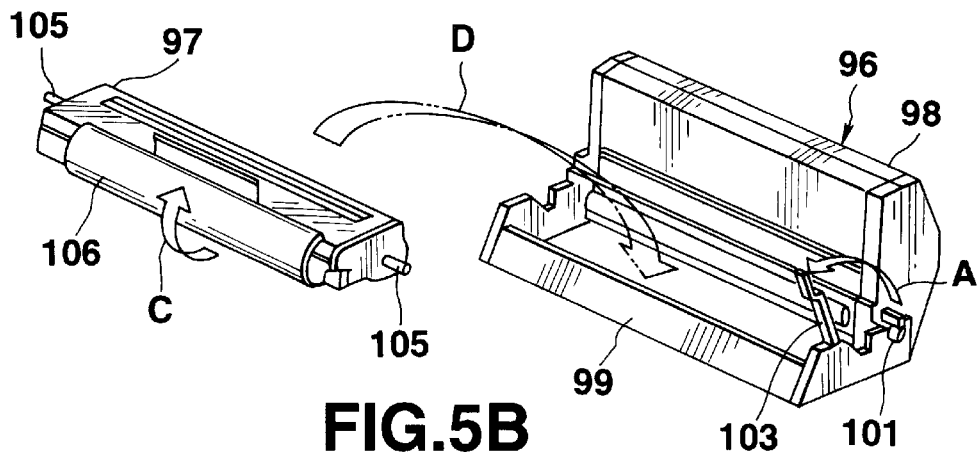
Figure 5C:
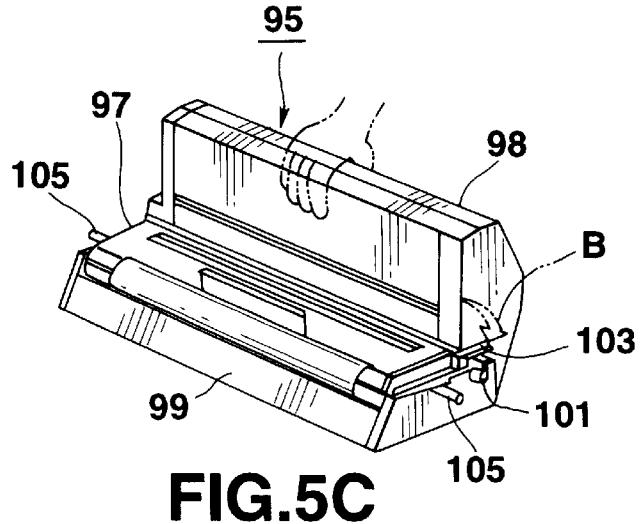

FIGS. 5A, 5B and 5C are perspective views showing steps of an assembling process for assembling two subunits to form one modification of the image forming portion of the one embodiment of the present invention. A multi assembly unit 95 is composed of a developing unit 96 and an image carrying unit 97. The developing unit 96 includes a casing 98 which serves also as a toner container, and a stirring member, a toner feed roller, a developing roller, and a doctor blade which are the same as those in FIG. 4 are arranged in the casing 98. A frame 99 on which the image carrying unit 97 is detachably mounted, is integrally formed at a lower part of the developing unit 96 to project from the casing 98 in the downstream side of the casing 98 with respect to the conveyance direction. A rotating shaft 101 of the developing roller projects outward from a lower part of one end surface of the casing 98.

A pair of bearing notches 102a and 102b are formed in respective upper ends of two side bridges of the frame 99, and a holding lever 103 is provided on one bridge of the frame 99. A downstream end of the holding lever 103 is attached on the one bridge of the frame 99 by a hinge, so that the upstream end portion thereof can be rocked up and down through about 90°, as indicated by arrows A and B in FIGS. 5B and 5C, between an open position at which the holding lever 103 opens one bearing notch 102a, and a closed position at which the holding lever 103 closes the bearing notch 102.

The image carrying unit 97 contains a photoconductive drum therein to be rotatable and is provided with an initial charger and a cleaner both of which are pressed on the outer peripheral surface of the drum (see FIG. 4). A rotating shaft 105 of the photoconductive drum projects outward from both end surfaces of the image carrying unit 97. A slit 104 is formed in that portion of a top surface of the unit 97 which is located just above the photoconductive drum and extends in parallel to the rotating shaft 105 of the drum. After the image forming unit 95 is attached to the predetermined mounting position in the apparatus body 46, a distal end of the printing head 43-1, 43-2, 43-3 or 43-4 supported on the top cover member 49 is fitted in the slit 104. Further, a guard cover 106 for covering a downwardly projecting part of the outer peripheral surface of the photoconductive drum is slidably mounted on the image carrying unit 97.

After the downwardly projecting part of the peripheral surface of the photoconductive drum is exposed by sliding the guard cover 106 in a direction of arrow C in FIG. 5B to its open position and the holding lever 103 of the frame 99 of the developing unit 96 is rotated to its open position, as indicated by an arrow A, the image carrying unit 97 is mounted on the frame 99, as indicated by an arrow D in FIG. 5B. After the unit 97 is mounted in this manner, the rotating shaft 105 of the developing unit 96 is placed on the bearing notches 102b and 102b, and the fixing lever 103 is rotated to its closed position as indicated by an arrow B in FIG. 5C, to support the shaft 105 of the photoconductive drum. The shaft 105 projects outward from both opposite end surfaces of the side bridges of the frame 99 of the developing unit 96.

After the developing unit 96 and the image carrying unit 97 are combined together in this manner to form the image forming portion 95, the four image forming portions 95 are mounted in the predetermined mounting positions in the image forming apparatus 46, like the four image forming portions 42-1, 42-2, 42-3 and 42-4 shown in FIG. 3. Also in this case, the developing units 96 of the image forming portions 95 can be formed to have the same shape as to each other and each of which has a capacity as large as possible without interfering with the movement locuses 45 of the printing heads 43 by setting the sizes of each developing unit 96 in the manner described above with reference to FIG. 1.

According to the embodiment and the modification described above, the top cover member 49 has one rotational center shaft 44 and is rotatably attached to the apparatus body 46 with the rotational center shaft 44 being located on the downstream side with respect to the sheet conveying direction. However, the present invention is not limited to this arrangement for the top cover member.

Figure 6:
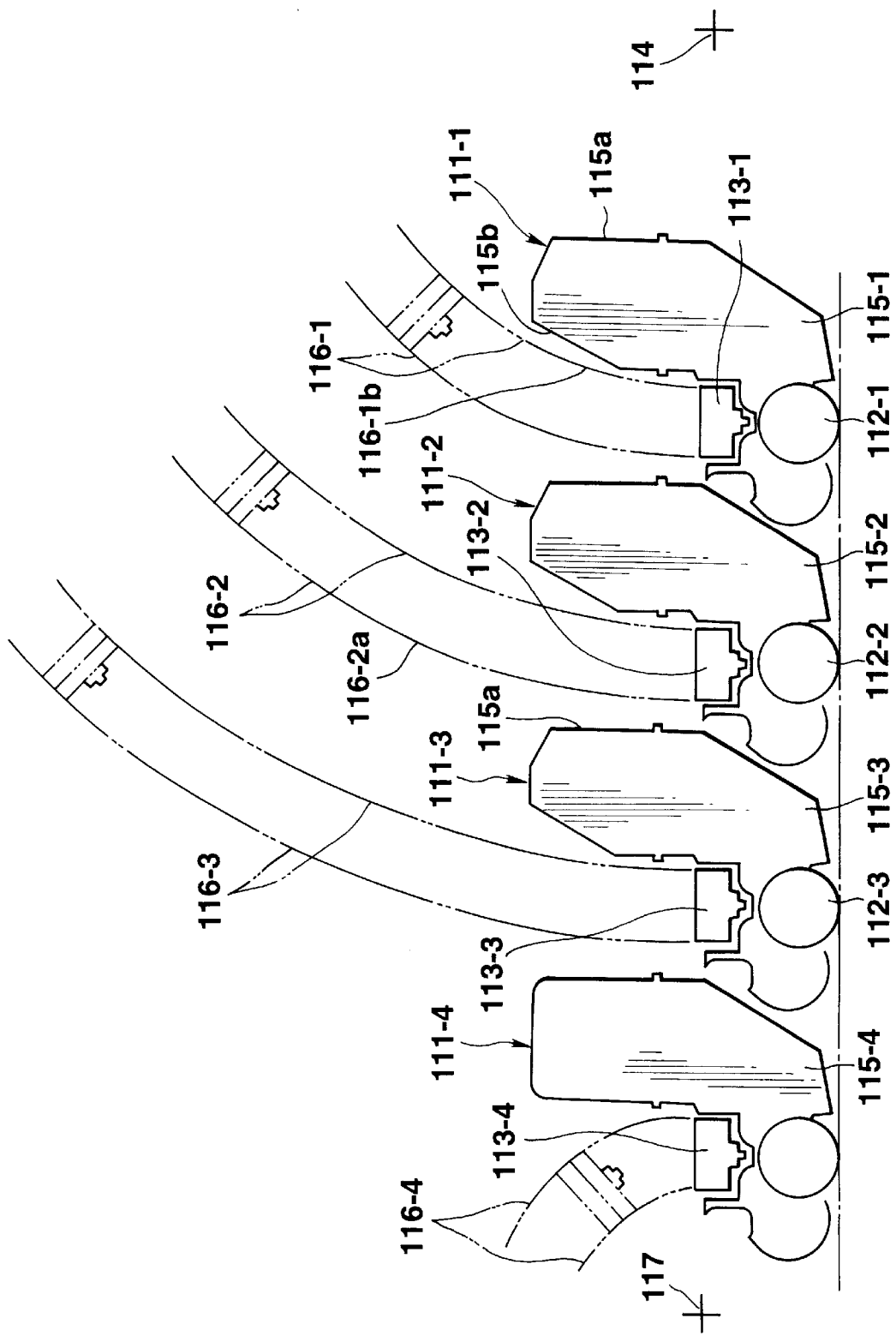
FIG. 6 is a side view showing an arrangement of a main part of an image forming apparatus according to another embodiment of the invention, in which two top cover members are rotatably supported at their opposite end portions on the apparatus, and a rotational center shaft for that top cover member which supports a plurality of printing heads is located on an upstream side with respect to a sheet transportation direction in the apparatus.
Figure 7:
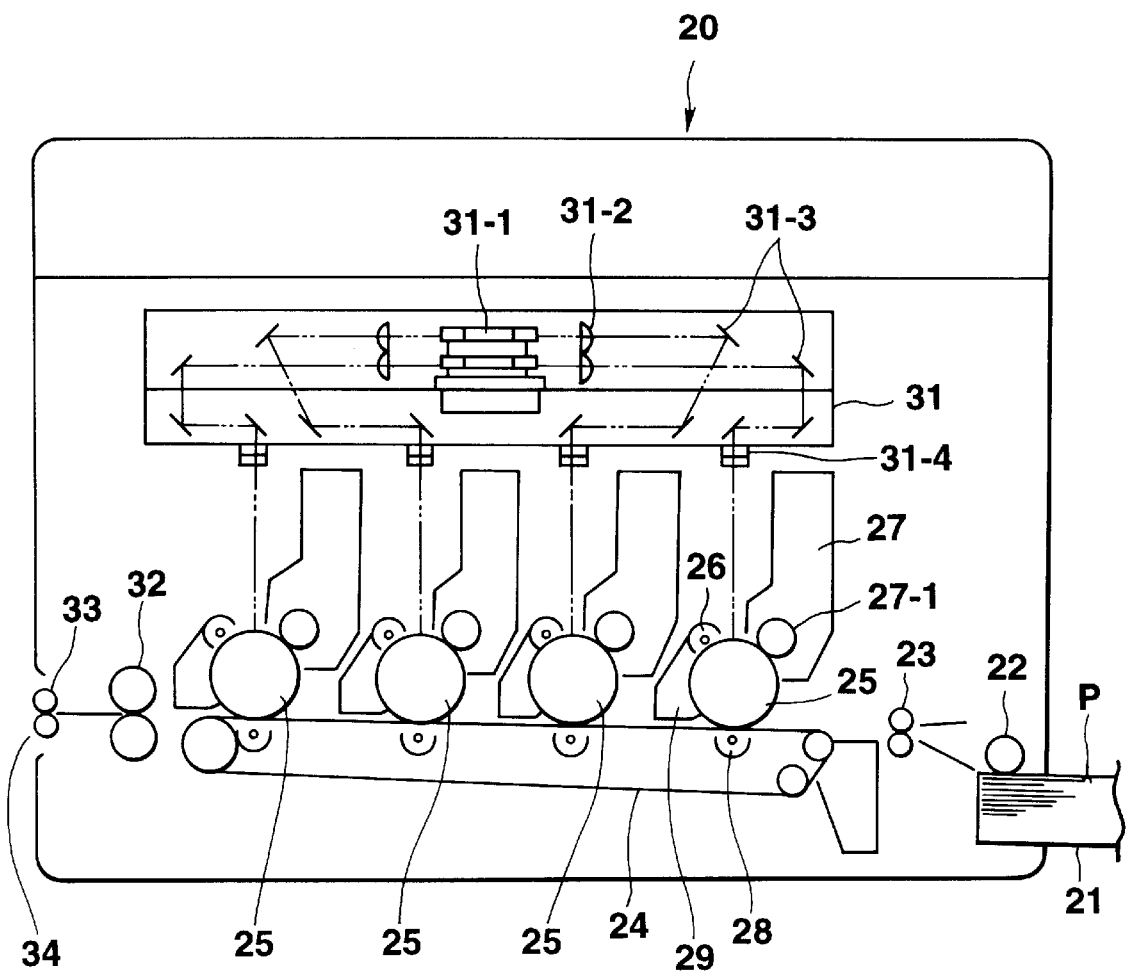
FIG. 7 is a longitudinal sectional view schematically showing a conventional tandem-type color image forming apparatus.

FIG. 6 is a longitudinal sectional view schematically showing a main part of an image forming apparatus according to another embodiment of the invention. In this arrangement, first and second top cover members are used, a rotational center shaft 114 of the first top cover member is rotatably supported on one end portion of the apparatus body, a rotational center shaft 117 of the second top cover member is rotatably supported on another end portion of the apparatus body which is located oppositely to the one end portion, the first top cover member supports a plurality of printing heads, and the rotation center shaft 114 of the first top cover member is located on the upstream side with respect to the sheet conveying direction. A method for forming image forming portions to have the same shape as to each other and each of which has a capacity as large as possible, will be described as follows.

In this modification, three image forming portions 111-1, 111-2 and 111-3 located in the upstream side of the sheet conveying direction have the same structure and the same shape as to each other, and each of their developing devices 115-1, 115-2 and 115-3 are arranged on the upstream side of each photoconductive drum 112-1, 112-2 or 112-3 with respect to the conveying direction. A first top cover member supports three printing heads 113-1, 113-2 and 113-3 on its lower surface and has a rotational center shaft 114 rotatably attached to the upstream end portion of the apparatus body with respect to the conveying direction. The first top cover member rotates between a closed position in which the three printing heads 113-1, 113-2 and 113-3 are located in their writing or printing positions as shown by solid lines in FIG. 6, to be assembled in their corresponding three image forming portions 111-1, 111-2 and 111-3, and an open position in which the three printing heads 113-1, 113-2 and 113-3 are removed upward as shown by two-dot chain lines from their writing or printing positions, to be disassembled from their corresponding three image forming portions 111-1, 111-2 and 111-3.

Each of the three developing devices 115-1, 115-2 and 115-3 has a first side surface 115a which is located near to the rotational center shaft 114 in each developing device and is directed toward the center shaft 114, and a second side surface 115b which is located away from the center shaft 114 in each developing device and is directed in a direction away from the center shaft 114.

And, the first side surface 115a of each developing device is so shaped that it does not interfere with the movement of that printing head 113-2 which is located secondarily from the rotational center shaft 114, in particularly it does not project into the movement locus 116-2a of that end of the printing head 113-2, that end being located farthest from the center shaft 114 in that printing head 113-2, when each of the three image forming portions 111-1, 111-2 and 111-3 is located thirdly from the rotational center shaft 114.

Further, the second side surface 115b of each developing device is so shaped that it does not interfere with the movement of that printing head 113-1 which is located nearest to or firstly from the center shaft 144, in particularly it does not project into the movement locus 116-1b of that end of that printing head 113-1, that end being located nearest from the center shaft 114 in that printing head 113-1 when each of the three image forming portions 111-1, 111-2 and 111-3 is located nearest to or firstly from the center shaft 114.

In this modification, the radius of each movement locus 116-1 of the printing head 113-1, the printing head 113-1 being located nearest to or firstly from the center shaft 114, is smaller than the radius of each movement locus 116-2 of the printing head 113-2, the printing head 113-2 being located secondary from the center shaft 114.

Therefore, even if the image forming portions 111-1, 111-2 and 111-3 having the above described same shape and structure as to each other are arranged in any of that three predetermined mounting positions in the apparatus body, that three predetermined mounting positions being located firstly to thirdly from the center shaft 114 in the apparatus body, the first side surface 115a of the development device 115-1, 115-2 or 115-3 of any image forming portion 111-1, 111-2 or 111-3 does not interfere with the arched movement of each printing head 113-2 or 113-1.

And, since each movement locus 116-3 of the printing head 113-3, the printing head 113-3 being located thirdly from the center shaft 114, will not face the first side surface 115a of the developing device 115-1, 115-2 or 115-3 of any image forming portion 111-1, 111-2 or 111-3, each movement locus 116-3 of the printing head 113-3 is free from the shape of the first side surface 115a of the developing device 115-1, 115-2 or 115-3.

Further, in this modification, the radius of each movement locus 116-2 or 116-3 of the printing heads 113-2 and 113-3, the printing heads 113-2 and 113-3 being located secondly and thirdly from the center shaft 44, is larger than the radius of each movement locus 116-1 of the printing head 113-1, the printing head 113-1 being located nearest to or firstly from the center shaft 114.

Therefore, even if the image forming portions 111-1, 111-2 and 111-3 having the above described same shape and structure as to each other are arranged in any of that three predetermined mounting positions in the apparatus body, that three predetermined mounting positions being located firstly to thirdly from the center shaft 114 in the apparatus body, the second side surface 115b of the development device 115-1, 115-2 or 115-3 of any image forming portion 111-1, 111-2 or 111-3 does not interfere with the arched movement of each printing head 113-1, 113-2 or 113-3.

As apparent from the above description, each of the three developing devices 115-1, 115-2 and 115-3 having the same shape as to each other has a capacity as large as possible.

In this modification, a printing head 113-4 corresponding to the image forming portion 111-4 which is located farthest from the center shaft 114 of the first top cover member or in the downstream end of the sheet conveying direction, is supported on the second top cover member.

When the first and second top cover members are rotated from their closed positions to their open positions, each movement locus 116-3 of the printing head 113-3 corresponding to the image forming portion 111-3 located adjacent to the downstream end image forming portion 111-4 is moved upwardly and sidewardly away from a first side surface of the developing device 115-4 of the downstream end image forming portion 111-4, the first side surface directing in the same direction as that in which the first side surface 115$a$ of each developing device 115-1, 115-2 or 115-3 of each of the other three image forming portions 111-1, 111-2 or 111-3 directs, and facing the movement locuses 116-3.

At the same time, each movement locus 116-4 of the printing head 113-4 corresponding to the downstream end image forming portion 111-4 is also moved upwardly and sidewardly away from a second side surface of the developing device 115-4 of the downstream end portion 111-4, the second side surface directing in a direction opposite to the direction in which the first side surface 115$a$ is directed, and facing the movement locuses 116-4.

As apparent from this, the first and second side surfaces of the developing device 115-4 of the downstream end image forming portion 111-4 do not collide with the movement locuses 116-3 of the printing head 113-3 neighboring the developing device 115-4 and the movement locuses 116-4 of the printing head 113-4 corresponding to the developing device 115-4. That is, the size of the developing device 115-4 in the conveying direction, or the capacity thereof, can be set larger than that of each of the other developing devices 115-1, 115-2 and 115-3.

Since the downstream end image forming portion 111-4 is usually used for forming a black toner image and is most frequently used than each of the other three image forming portions 111-1, 111-2 and 111-3, it is preferable that the capacity of the developing device 115-4 of the downstream end image forming portion 111-4 is so set that a black toner supplement cycle becomes substantially equal to other color toner supplement cycle.

According to the present invention, as described in detail herein, the predetermined parts of a plurality of image forming portions can be formed to have the same shape as to each other and to make each of which has a capacity as large as possible. Thus, the manufacturing process and the assembling process of the image forming apparatus of this invention can be more easily, and can efficiently use the inner space of the apparatus to promote the miniaturization of the apparatus.

What is claimed is:

1. An image forming apparatus comprising:

a plurality of image forming portions;

a plurality of processing means for image formation on each of the image forming portions;

each of the image forming portions including an image carrier and a casing enclosing at least one of the processing means for image formation on the image carrier;

first support means for supporting the image forming portions side by side at predetermined intervals;

a plurality of write means for writing image information on each of the image carriers opposed thereto;

second support means for supporting the write means side by side at predetermined intervals; and a rock mechanism allowing one of the first and second support means to rock around at one end thereof in a direction in which the image forming portions or the write means supported by one of the first and second support means are arranged, with respect to the other support means, so that the image forming portions and the write means can move relatively to one another, wherein:

each casing has that portion of the same shape as to each other at a predetermined side of a write position on that image carrier corresponding to each casing, at the write position that write means which corresponds to the case, writing an image information on that image carrier;

that portion of each casing has a first side surface which is located near to the rock mechanism and directs in a direction approaching the rock mechanism, and a second side surface which is located farther away from the rock mechanism than the first side surface and directs in a direction opposite to the direction in which the first side surface directs;

where the image forming portions are arranged in any order with each of the same shaped portions of their casings being located at that side of the write position corresponding thereto, which is far away from the rock mechanism than the other side of the corresponding write position, the first side surface of the casing of the image forming portion is so shaped that it escapes from a locus of that portion of that write means, that write means being located farthest from the rock mechanism and that portion being located farthest from the rock mechanism in that write means, when the image forming portion is arranged to be farthest from the rock mechanism and the write means is moved away from and approached the casing corresponding thereto, and the second side surface of the casing of the image forming portion is so shaped that it escape from a locus of that portion of that write means, that write means being located secondarily nearest to the rock mechanism and that portion being located nearest to the rock mechanism in that write means, when the image forming portion is arranged to be nearest to the rock mechanism and that write means is moved away from and approached the casing corresponding thereto; and where the image forming portions are arranged in any order with each of the same shaped portions of their casings being located at that side of the write position corresponding thereto, which is nearer to the rock mechanism than the other side of the write position, the first side surface of the casing of the image forming portion is so shaped that it escapes from a locus of that portion of that write means, that write means being located secondarily farthest to the rock mechanism and that portion being located farthest from the rock mechanism in that write means, when the image forming portion is arranged to be farthest from the rock mechanism and that write means is moved away from and approached the casing corresponding thereto, and the second side surface of the casing of the image forming portion is so shaped that it escape from the locus of that portion of that write means, that write means being located nearest to the rock mechanism and that portion being nearest to the rock mechanism in that write means, when the image forming portion is arranged to be nearest to the rock mechanism and that write means is moved away from and approached the casing corresponding thereto.

2. An image forming apparatus according to claim 1, wherein said first support means is fixed to the body of the apparatus, and said second support means is movable.

3. An image forming apparatus according to claim 2, wherein said casing constitutes a developing device for developing the image information written on the image carrier by the write means, with use of a developing agent.

4. An image forming apparatus according to claim 2, wherein the number of said image forming portions is three or four in number, and said image forming apparatus is a tandem-type color image forming apparatus for forming color images.

5. An image forming apparatus according to claim 3, wherein said write means is optical write means including an optical member, and said image carrier is a photoconductive member.

6. An image forming apparatus according to claim 5, wherein said optical write means is a Light Emitting Diode head.

7. An image forming apparatus according to claim 6, wherein the number of said image forming portions is three or four, and said image forming apparatus is a tandem-type color image forming apparatus for forming color images.

8. An image forming apparatus according to claim 1, wherein said second support means is fixed to the body of the apparatus, and said first support means is movable.

9. An image forming apparatus according to claim 8, wherein said casing constitutes a developing device for developing the image information written on the image carrier by the write means, with use of a developing agent.

10. An image forming apparatus according to claim 8, wherein the number of said image forming portions is three or four in number, and said image forming apparatus is a tandem-type color image forming apparatus for forming color images.

11. An image forming apparatus according to claim 9, wherein said write means is optical write means including an optical member, and said image carrier is a photoconductive member.

12. An image forming apparatus according to claim 11, wherein said optical write means is a Light Emitting Diode head.

13. An image forming apparatus according to claim 12, wherein the number of said image forming portions is three or four in number, and said image forming apparatus is a tandem-type color image forming apparatus for forming color images.

14. An image forming apparatus according to claim 1, wherein said casing constitutes a developing device for developing the image information written on the image carrier by the write means with use of a developing agent.

15. An image forming apparatus according to claim 14, wherein said write means is optical write means including an optical member, and said image carrier is a photoconductive member.

16. An image forming apparatus according to claim 14, wherein the number of said image forming portions is three or four in number, and said image forming apparatus is a tandem-type color image forming apparatus for forming color images.

17. An image forming apparatus according to claim 15, wherein said optical write means is a Light Emitting Diode head.

18. An image forming apparatus according to claim 15, wherein the number of said image forming portion is three or four in number, and said image forming apparatus is a tandem-type color image forming apparatus for forming color images.

19. An image forming apparatus according to claim 17, wherein the number of said image forming portions is three or four in number, and said image forming apparatus is a tandem-type color image forming apparatus for forming color images.

20. An image forming apparatus according to claim 1, wherein the number of said image forming portions is three or four in number, and said image forming apparatus is a tandem-type color image forming apparatus for forming color images.

* * * * *